US012640798B2

(12) United States Patent
Zhang et al.

(10) Patent No.: US 12,640,798 B2
(45) Date of Patent: May 26, 2026

(54) MACHINE LEARNING-BASED BEAM SELECTION

(71) Applicant: Apple Inc., Cupertino, CA (US)

(72) Inventors: Yushu Zhang, Beijing (CN); Dawei Zhang, Saratoga, CA (US); Haitong Sun, Cupertino, CA (US); Huaning Niu, San Jose, CA (US); Oghenekome Oteri, San Diego, CA (US); Seyed Ali Akbar Fakoorian, San Diego, CA (US); Sigen Ye, San Diego, CA (US); Wei Zeng, Saratoga, CA (US); Weidong Yang, San Diego, CA (US)

(73) Assignee: Apple Inc., Cupertino, CA (US)

( * ) Notice: Subject to any disclaimer, the term of this patent is extended or adjusted under 35 U.S.C. 154(b) by 823 days.

(21) Appl. No.: 17/756,841

(22) PCT Filed: Jun. 7, 2021

(86) PCT No.: PCT/CN2021/098671
§ 371 (c)(1),
(2) Date: Jun. 3, 2022

(87) PCT Pub. No.: WO2022/256979
PCT Pub. Date: Dec. 15, 2022

(65) Prior Publication Data
US 2024/0195482 A1     Jun. 13, 2024

(51) Int. Cl.
*H04W 24/10* (2009.01)
*H04B 7/06* (2006.01)

(52) U.S. Cl.
CPC ........ *H04B 7/06952* (2023.05); *H04W 24/10* (2013.01)

(58) Field of Classification Search
USPC ........ 370/241, 252, 328, 329, 330, 331, 332
See application file for complete search history.

(56) References Cited

U.S. PATENT DOCUMENTS

| | | | |
|---|---|---|---|
| 2020/0029274 A1* | 1/2020 | Cheng | H04W 76/28 |
| 2020/0084678 A1* | 3/2020 | Gunnarsson | H04W 36/0085 |
| 2020/0221323 A1 | 7/2020 | Xu et al. | |
| 2021/0058131 A1 | 2/2021 | Zhu et al. | |
| 2021/0306060 A1* | 9/2021 | Matsumura | H04W 24/10 |

(Continued)

FOREIGN PATENT DOCUMENTS

WO          2020/062130          4/2020

OTHER PUBLICATIONS

NTT Docomo, "Views on beam management details", 3GPP TSG RAN WG1 Meeting #89, R1-1708451, May 19, 2017, 9 sheets.

(Continued)

*Primary Examiner* — Nguyen H Ngo
(74) *Attorney, Agent, or Firm* — Fay Kaplun & Marcin, LLP

(57) ABSTRACT

A user equipment (UE) is configured to select a beam. The UE receives, from a base station of a wireless network, a beam pattern configuration, reports, to the base station, a subset of beams on which measurements will be performed, performs measurements on the subset of beams, updates a beam search space (BSS) based on the measurements, reports the updated BSS to the base station and selects a beam from the updated BSS to switch to.

17 Claims, 6 Drawing Sheets

(56)     References Cited

U.S. PATENT DOCUMENTS

| | | | | |
|---|---|---|---|---|
| 2021/0321382 A1* | 10/2021 | Nam | .................... | H04B 7/0695 |
| 2021/0351885 A1* | 11/2021 | Chavva | .................... | G06N 3/08 |
| 2021/0392626 A1* | 12/2021 | Hu | .................... | H04B 7/06958 |
| 2022/0225248 A1* | 7/2022 | Landis | ................. | H04L 5/0053 |
| 2022/0263558 A1* | 8/2022 | Zhu | .................... | H04B 7/0626 |
| 2022/0408446 A1* | 12/2022 | Zirwas | ................ | H04W 24/08 |
| 2023/0217265 A1* | 7/2023 | Huang | ................ | H04B 7/0617 |
| | | | | 370/329 |
| 2023/0396393 A1* | 12/2023 | Yao | ....................... | H04L 5/0057 |
| 2024/0022308 A1* | 1/2024 | Kalantari | ................ | G01S 5/01 |
| 2024/0107352 A1* | 3/2024 | Zhu | .................... | H04B 7/06958 |
| 2024/0267174 A1* | 8/2024 | Liu | ..................... | H04B 7/0695 |

OTHER PUBLICATIONS

Huawei et al., "DL beam management", 3GPP TSG RAN WG1 Meeting #88b, R1-1704229, Apr. 7, 2017, 10 sheets.

* cited by examiner

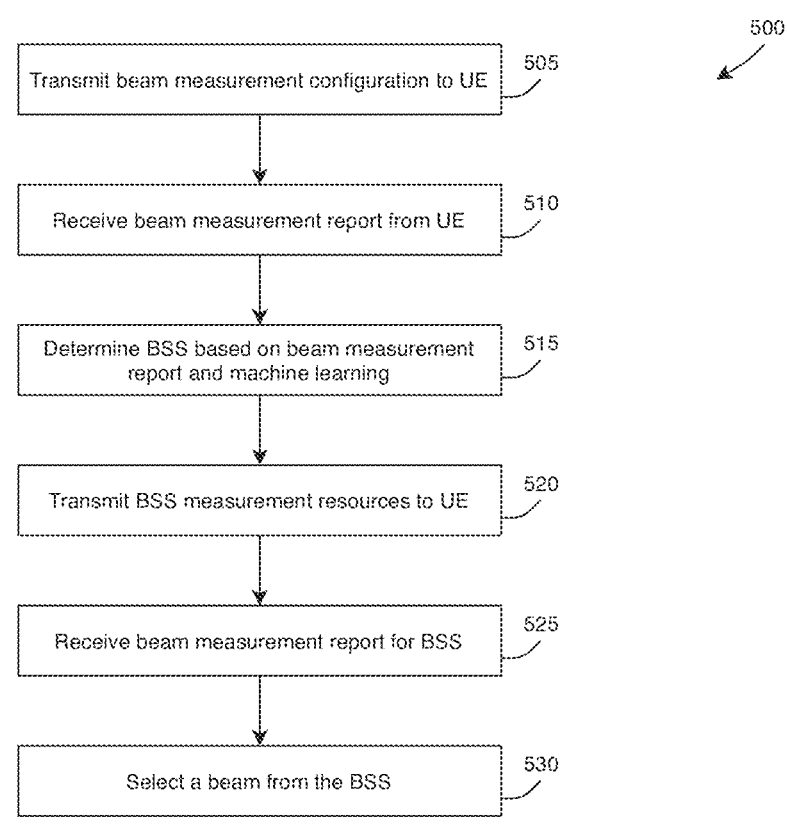
Fig. 5A
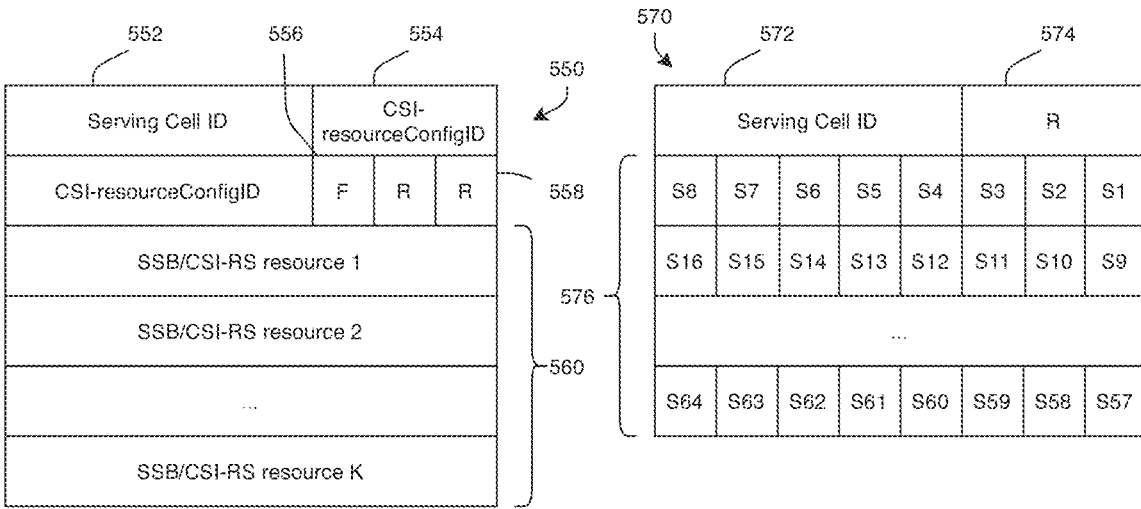
Fig. 5B                                          Fig. 5C

MACHINE LEARNING-BASED BEAM SELECTION

TECHNICAL FIELD

This application relates generally to wireless communication, and in particular relates to Machine Learning-Based Beam Selection.

BACKGROUND

In 5G new radio (NR) wireless communications, user equipment (UE) measures a plurality of beams, transmits the result of the beam measurement to a base station of a 5G NR wireless network, and receives an indication from the base station selecting a beam to use for communications between the UE and the network.

SUMMARY

Some exemplary embodiments are related to a processor of a user equipment (UE) configured to perform operations. The operations include receiving, from a base station of a wireless network, a beam pattern configuration, reporting, to the base station, a subset of beams on which measurements will be performed, performing measurements on the subset of beams, updating a beam search space (BSS) based on the measurements, reporting the updated BSS to the base station and selecting a beam from the updated BSS to switch to.

Other exemplary embodiments are related to a processor of a base station configured to perform operations. The operations include transmitting a beam measurement configuration to a user equipment (UE), wherein the beam measurement configuration includes a subset of beams from all available beams on which the UE is configured to perform a measurement, receiving a beam measurement report from the UE including measurements corresponding to the subset of beams, determining a beam search space (BSS) based on the beam measurement report, indicating BSS measurement resources to the UE, receiving a BSS beam measurement report from the UE based on the BSS measurement resources and selecting a beam from the BSS based on the BSS beam measurement report.

BRIEF DESCRIPTION OF THE DRAWINGS

FIG. 5A shows a method of selecting a beam based on machine learning by a base station according to various exemplary embodiments.

FIGS. 5B and 5C show exemplary medium access control (MAC) control elements (CE) configured to indicate on which beams a UE should perform a measurement according to various exemplary embodiments.

DETAILED DESCRIPTION

Figure 1:
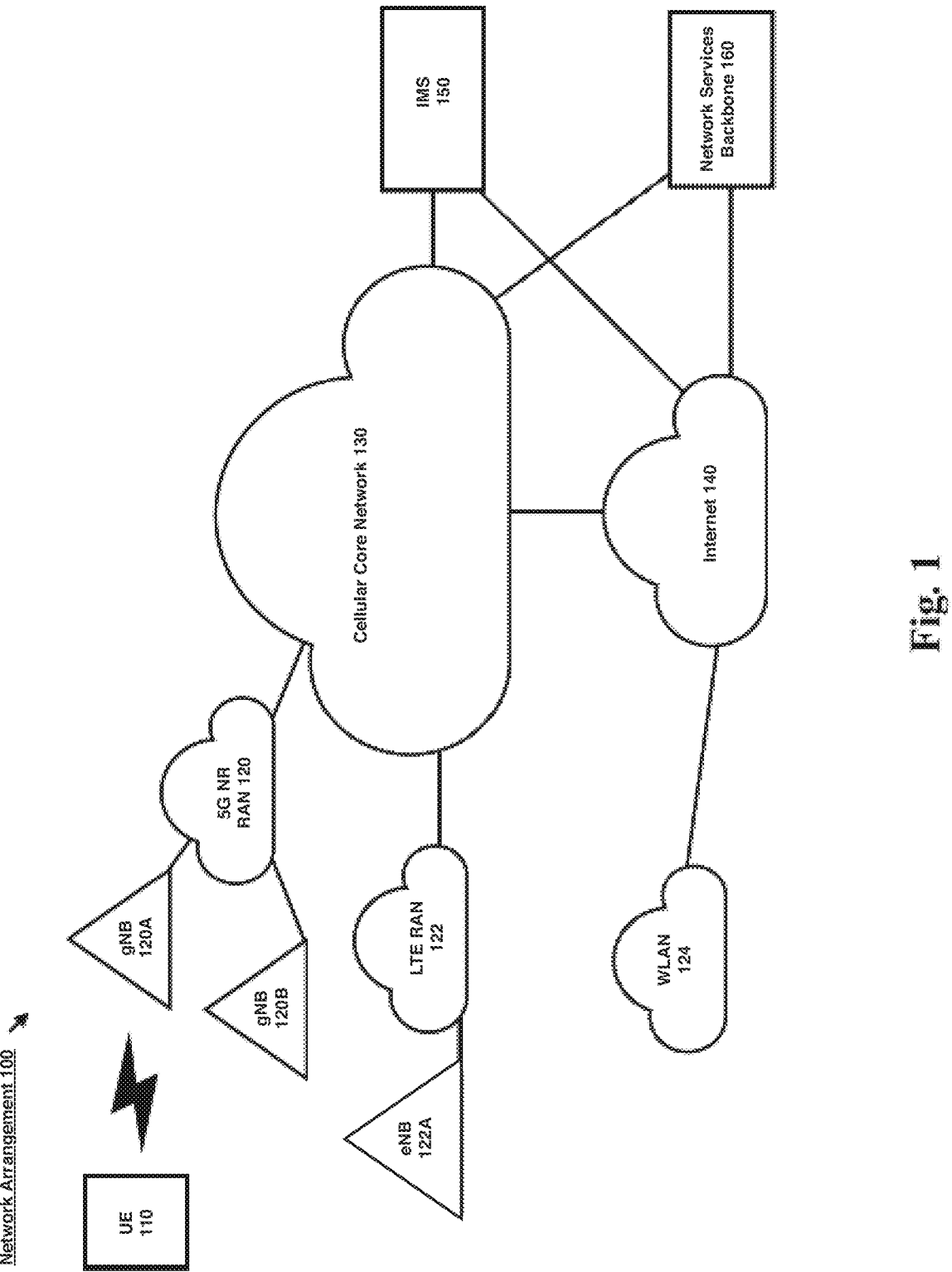
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to machine learning-based selection of a beam from a plurality of beams by a UE or base station of a wireless network.

The exemplary embodiments are described with regard to a UE. However, reference to a UE is merely provided for illustrative purposes. The exemplary embodiments may be utilized with any electronic component that may establish a connection to a network and is configured with the hardware, software, and/or firmware to exchange information and data with the network. Therefore, the UE as described herein is used to represent any appropriate electronic component.

In addition, the exemplary embodiments are described with regard to a 5G New Radio (NR) network. However, reference to a 5G NR network is merely provided for illustrative purposes. The exemplary embodiments may be utilized with any network that implements the functionalities described herein.

When a UE performs beam measurement and provides a beam measurement report to a base station of the network, the UE typically measures all the available beams (e.g., 32 beams in NR). As a result, latency is increased because of the necessary delay to allow the UE to perform all of the beam measurements. After the UE performs the beam measurements, the UE reports a plurality (e.g., 4) of beams that have the best measurements. The base station then transmits an indication of which of those beams the UE should use to communicate with the network.

According to some exemplary embodiments, the UE may be configured to perform measurements on a subset of the available beams. A beam search space is determined based on machine learning and the beam measurements. Based on the beam quality of the beam search space, a beam is selected for communications between the UE and the network.

FIG. 1 shows an exemplary network arrangement 100 according to various exemplary embodiments. The exemplary network arrangement 100 includes a UE 110. It should be noted that any number of UE may be used in the network arrangement 100. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network configuration 100, the networks with which the UE 110 may wirelessly communicate are a 5G New Radio (NR) radio access network (5G NR-RAN) 120, an LTE radio access network (LTE-RAN) 122 and a wireless local access network (WLAN) 124. However, it should be understood that the UE 110 may also communicate with other types of networks and the UE 110 may also communicate with networks over a wired connection. Therefore, the UE 110 may include a 5G NR chipset to communicate with the 5G NR-RAN 120, an LTE chipset to communicate with the LTE-RAN 122 and an ISM chipset to communicate with the WLAN 124.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UE that are equipped with the appropriate cellular chip set. The WLAN 124 may include any type of wireless local area network (WiFi, Hot Spot, IEEE 802.11x networks, etc.).

The UE 110 may connect to the 5G NR-RAN 120 via the gNB 120A and/or the gNB 120B. The gNBs 120A and 120B may be configured with the necessary hardware (e.g., antenna array), software and/or firmware to perform massive multiple in multiple out (MIMO) functionality. Massive MIMO may refer to a base station that is configured to generate a plurality of beams for a plurality of UE. During operation, the UE 110 may be within range of a plurality of gNBs. Reference to two gNBs 120A, 120B is merely for illustrative purposes. The exemplary embodiments may apply to any appropriate number of gNBs. Further, the UE 110 may communicate with the eNB 122A of the LTE-RAN 122 to transmit and receive control information used for downlink and/or uplink synchronization with respect to the 5G NR-RAN 120 connection.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station (e.g., the gNB 120A of the 5G NR-RAN 120).

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
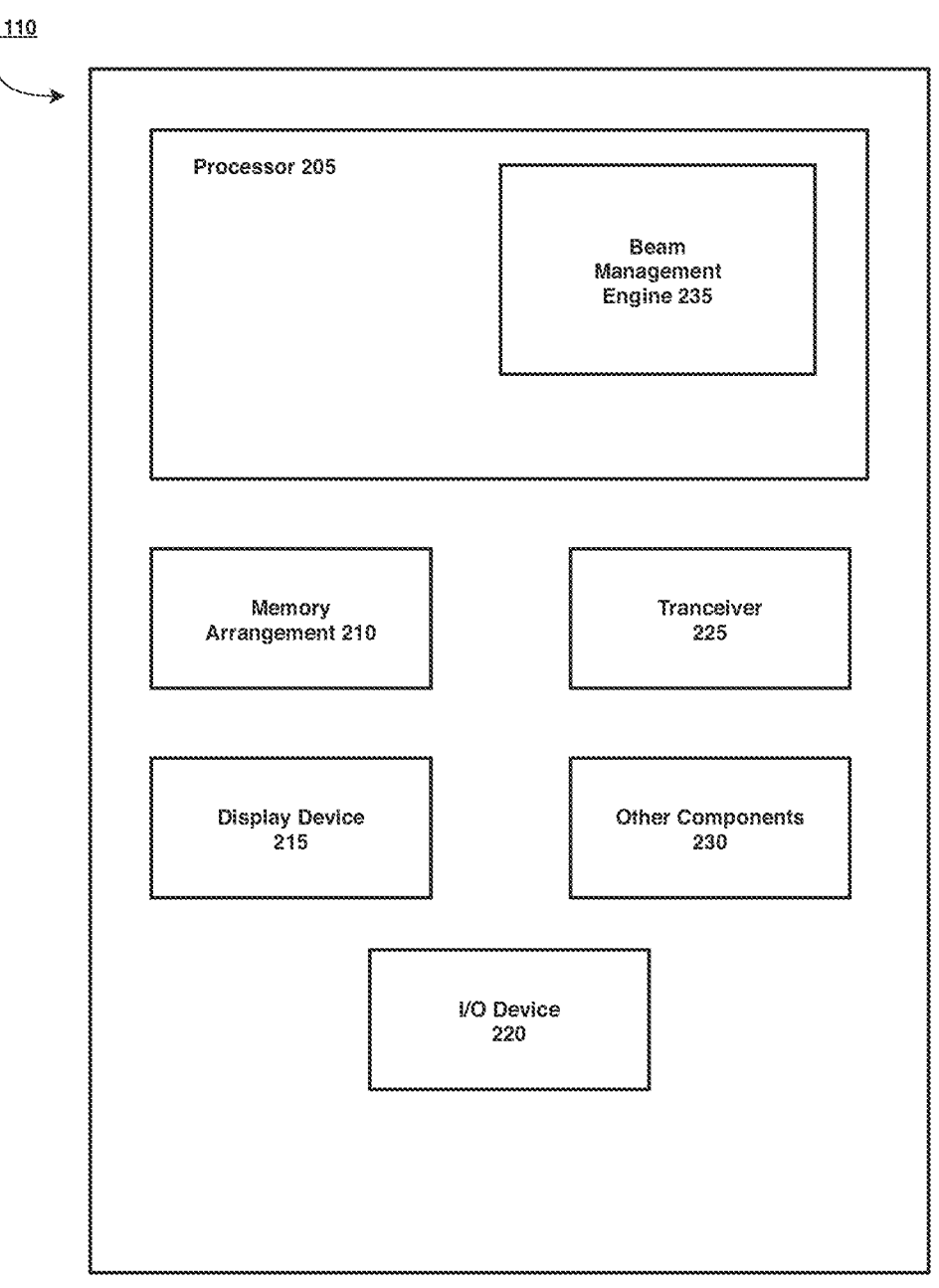
FIG. 2 shows an exemplary user equipment (UE) according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device

215, an input/output (I/O) device 220, a transceiver 225 and other components 230. The other components 230 may include, for example, an audio input device, an audio output device, a battery that provides a limited power supply, a data acquisition device, ports to electrically connect the UE 110 to other electronic devices, one or more antenna panels, etc. For example, the UE 110 may be coupled to an industrial device via one or more ports.

The processor 205 may be configured to execute a plurality of engines of the UE 110. For example, the engines may include a beam management engine 235. The beam management engine 235 may perform various operations related to selecting one of a plurality of beams for communicating with the network 100 based on machine learning, as will be described in greater detail below.

The above referenced engine being an application (e.g., a program) executed by the processor 205 is only exemplary. The functionality associated with the engine may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UE, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, the LTE-RAN 122, the WLAN 124, etc. Accordingly, the transceiver 225 may operate on a variety of different frequencies or channels (e.g., set of consecutive frequencies).

Figure 3:
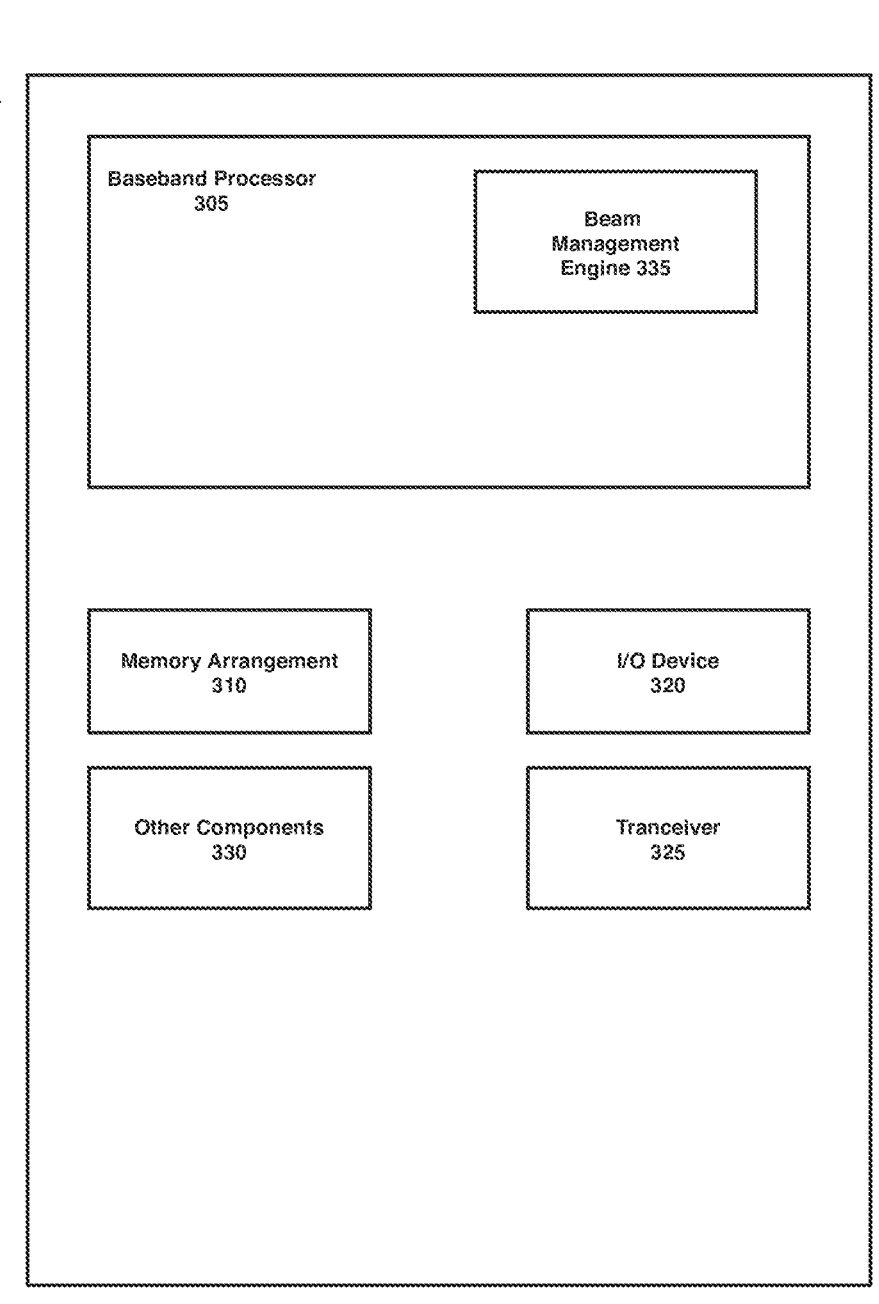
FIG. 3 shows an exemplary base station according to various exemplary embodiments.

FIG. 3 shows an exemplary network base station, in this case gNB 120A, according to various exemplary embodiments. The gNB 120A may represent any access node of the 5G NR network through which the UE 110 may establish a connection. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, a power supply, a data acquisition device, ports to electrically connect the gNB 120A to other electronic devices, etc.

The processor 305 may be configured to execute a plurality of engines of the gNB 120A. For example, the engines may include beam management engine 335 for performing operations including configuring the UE 110 to perform measurements on a subset of all available beams and to select one beam for communicating with the UE 110 based on machine learning. Examples of this process will be described in greater detail below.

The above noted engine being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary aspects may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

Figures 4A, 4B, 4C, 4D:
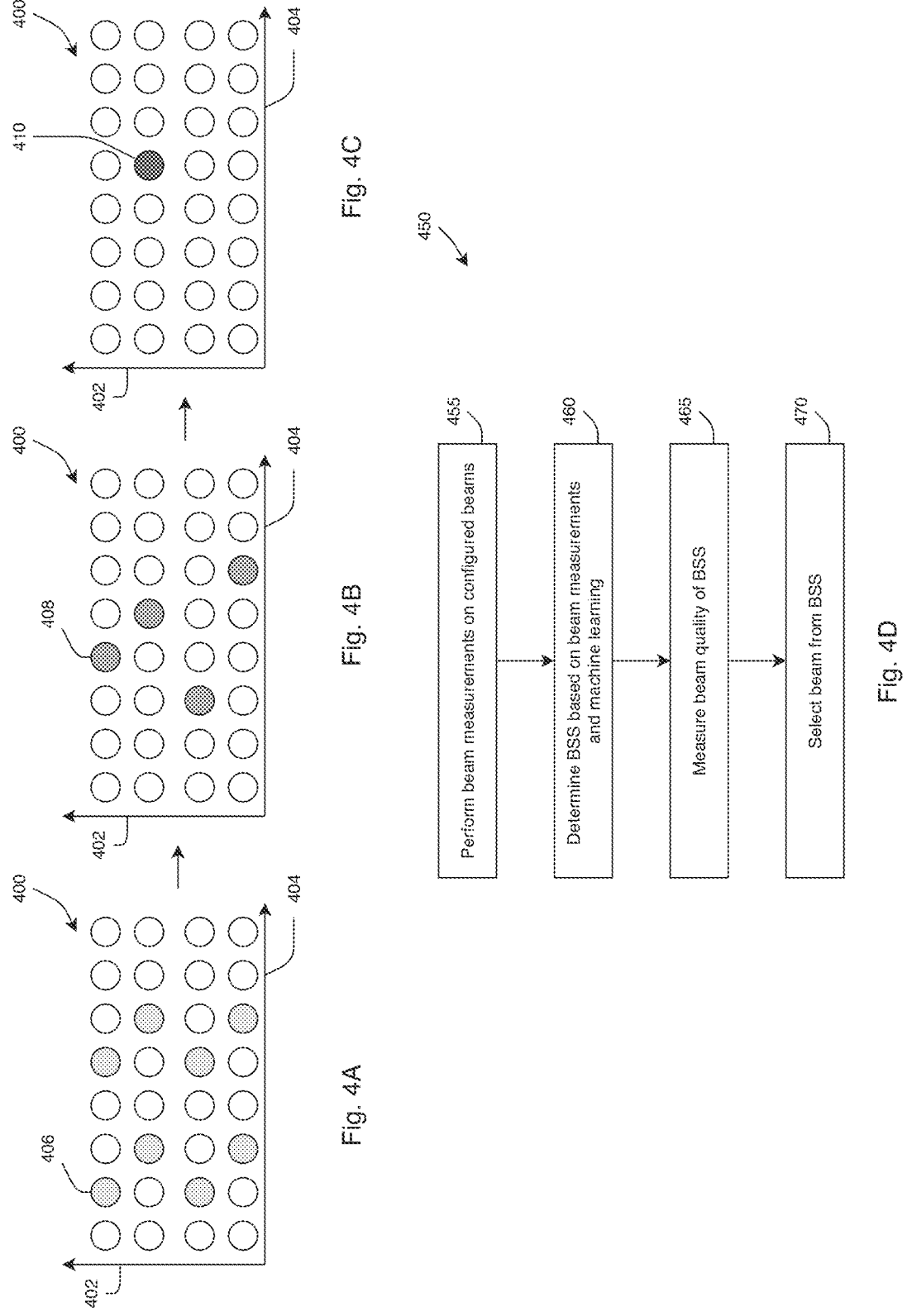
FIGS. 4A-4C show an exemplary machine learning-based beam selection process according to various exemplary embodiments.
FIG. 4D shows a method of selecting a beam based on machine learning according to various exemplary embodiments.

FIGS. 4A-4C show an exemplary machine learning-based beam selection process according to various exemplary embodiments. FIG. 4D shows a method 450 of selecting a beam based on machine learning according to various exemplary embodiments. The method 450 will be described with reference to the diagrams illustrated in FIGS. 4A-4C.

As illustrated in FIGS. 4A-4B, it is assumed that a total of 32 beams 400 are available at the UE 110. A first axis 402 represents the vertical angle and a second axis 404 represents the horizontal angle. FIG. 4A illustrates configured beams 406 which the gNB 120A (or 120B) configures the UE 110 to measure. At 455, the UE 110 performs the measurements on the configured beams 406.

After the UE 110 measures the configured beams 406, at 460, a beam search space having a plurality of beams 408 (4 shown in FIG. 4B), is determined based on machine learning and on the beam measurements performed at 455. In some embodiments, the gNB 120A may be preconfigured with machine learning and may determine the BSS, as will be discussed in greater detail below. In some embodiments, the UE 110 may alternatively be configured with machine learning and may determine the BSS, as will also be discussed in greater detail below. Because the UE 110 or gNB 120A uses machine learning, with which the UE 110 or gNB 120A is preconfigured, in addition to the measurements performed on the configured beams 406, the plurality of beams 408 of the BSS may be different than the configured beams 406, as illustrated in FIGS. 4A and 4B.

At 465, the beam quality of the BSS is measured (by the gNB 120A or the UE 110). At 470, one beam 410 is selected from the BSS. In some embodiments, the one beam 410 may be determined by the gNB 120A and indicated to the UE 110. In some embodiments, the UE 110 and the gNB 120A may both independently switch to the one beam 410.

FIG. 5A shows a method 500 of selecting a beam based on machine learning by a base station (e.g., gNB 120A) according to various exemplary embodiments. At 505, the gNB 120A transmits a beam measurement configuration to the UE 110. In the beam measurement configuration, the gNB 120A may configure the UE 110 to report layer 1 (L1) reference signal received power (RSRP) for each configured beam. In some embodiments, in the channel state information (CSI) report configuration (CSI-reportConfig) the gNB 120A may indicate the number of beam measurements to be reported by the UE 110 as "all." That is, if the nrofReportedRS field in the CSI-reportConfig is set to all, then all of the beams configured by the gNB 120A for the UE 110 to measure should be reported. In some embodiments, the gNB 120A may alternatively configure the nrofReportedRS field with other values less than all (e.g., n6, n8, n12, n16, etc.) to indicate to the UE 110 how many beam measurements should be reported. As such, the gNB 120A may advantageously configure the UE 110 to measure and report the L1-RSRP for particular beams. In some embodiments, the gNB 120A may configure the UE 110 to report absolute L1-RSRP values instead of differential L1-RSRP values to decrease the probability of any quantization or measurement errors. In some embodiments, the CSI-reportConfig may include a new quantizationScheme field that can be set to differential or absolute to indicate whether the reported measurements should be differential or absolute values. In some embodiments, when the number of reported beam measurements is the same as the number of configured beams or when the nrofReportedRS field is set to all, this provides an implicit indication to the UE 110 that it should report absolute L1-RSRP values.

At 510, the gNB 120A receives the beam measurement report from the UE 110. In some embodiments, when the number of configured beams is the same as the number of reported beams, the UE 110 need not report the synchronization signal block (SSB) index or channel state information reference signal (CSI-RS) index. Instead, the UE 110 may report the L1-RSRP for each beam in a one-to-one correspondence. For example, in some embodiments, the first reported L1-RSRP corresponds to the first configured SSB/CSI-RS, the second reported L1-RSRP corresponds to the second configured SSB/CSI-RS, etc.

At 515, the gNB 120A determines a BSS based on machine learning and the beam measurements received from the UE 110. At 520, the gNB 120A indicates the BSS measurement resources to the UE 110 for measurement of the beams of the BSS. In some embodiments, the gNB 120A may indicate the BSS resources to the UE 110 via dynamic signaling based on a periodic SSB or CSI-RS.

In some embodiments, the dynamic signaling may update the channel measurement resource (CMR) or CMR and interference measurement resource (IMR) of a CSI-reportConfig or CSI-resourceConfig via a MAC CE or downlink control information (DCI). An example of such a MAC CE 550 is illustrated in FIG. 5B. In some embodiments, the MAC CE 550 may include a Serving Cell ID field 552 to indicate the serving cell, a CSI-resourceConfigID field to indicate the report ID, an indicator field "F" 556 that indicates whether the resources are based on SSB or CSI-RS, two reserved bit fields 558, and a list of SSB/CSI-RS resource ID fields 560 (up to K fields). The MAC CE 550 provides the UE 110 with an updated list of resources on which to perform CMR or CMR and IMR measurements. These resources correspond to the beams of the BSS determined by the gNB 120A at 515.

In some embodiments, the dynamic signaling may alternatively activate or deactivate the CMR or CMR and IMR of a CSI-reportConfig or CSI-resourceConfig or SSB/CSI-RS in a bandwidth part or serving cell via a MAC CE or DCI. An example of such a MAC CE 570 is illustrated in FIG. 5C. In some embodiments, the MAC CE 570 may include a Serving Cell ID field 572 to indicate the serving cell, reserved bits field 574, and a bitmap 576 of SSBs. Because there are up to 64 SSBs in a CSI-reportConfig or CSI-resourceConfig, the bitmap 576 includes 64 bits (S1-S64). The bitmap 576 of the MAC CE 570 indicates to the UE 110 for which SSB (or CSI-RS) CMR or CMR and IMR measurements are activated. For example, a value of 1 indicates that the corresponding SSB (or CSI-RS) is acti-
vated, whereas a value of 0 indicates that SSB (or CSI-RS)
is deactivated. The UE 110, in turn, only measures the SSBs
(or CSI-RSs) of the enabled SSBs (or CSI-RSs).

In some embodiments, the gNB 120A may alternatively
indicate the BSS resources to the UE 110 by triggering
multiple aperiodic CSI-RS resources or resource sets for
measurement of the beams of the BSS. In some embodi-
ments, the gNB 120A may trigger multiple aperiodic CSI-
RS resources, each of which spans multiple symbols. In such
an embodiment, the UE 110 may perform beam sweeping
for each CSI-RS resource and determine the beam with the
best performance/quality (e.g., L1-RSRP). In some embodi-
ments, the gNB 120A may alternatively trigger multiple
aperiodic CSI-RS resource sets, each of which includes
multiple single symbol CSI-RS resources corresponding to
the same port (with repetition set to 'on'). In such an
embodiment, the UE 110 may report the CSI-RS resource set
ID along with the beam quality (e.g., the L1-RSRP). Alter-
natively, the UE 110 may report the CSI-RS resource ID
along with the beam quality but may only report one
resource from a resource set.

At 525, the gNB 120A receives the beam measurement
report from the UE 110 for the beams of the BSS. At 530,
the gNB 120A selects a beam based on the beam measure-
ment report received at 525. In some embodiments, the gNB
120A selects the beam and sends a beam indication to the
UE 110 to indicate which beam the UE 110 should switch to.
Alternatively, in some embodiments, the gNB 120A and the
UE 110 may both automatically switch to the beam based on
the beam measurement report at 525. In such an embodi-
ment, the gNB 120A and the UE 110 switch to the beam after
K symbols, where K is one of a predefined value, configured
via RRC signaling, or based on UE capability. In some
embodiments, whether the gNB 120A selects the beam and
provides the UE 110 with the beam indication or the gNB
120A and the UE 110 automatically switch to the beam may
be configured by higher layer signaling (e.g., RRC signal-
ing) or reported by the UE 110. For example, the UE 110
may provide such information in a UE capability transmis-
sion or via the beam measurement report for the BSS. In
some embodiments, the UE 110 may indicate whether the
UE 110 will switch to the beam with the best quality (e.g.,
L1-RSRP) in the beam measurement report.

Figure 6:
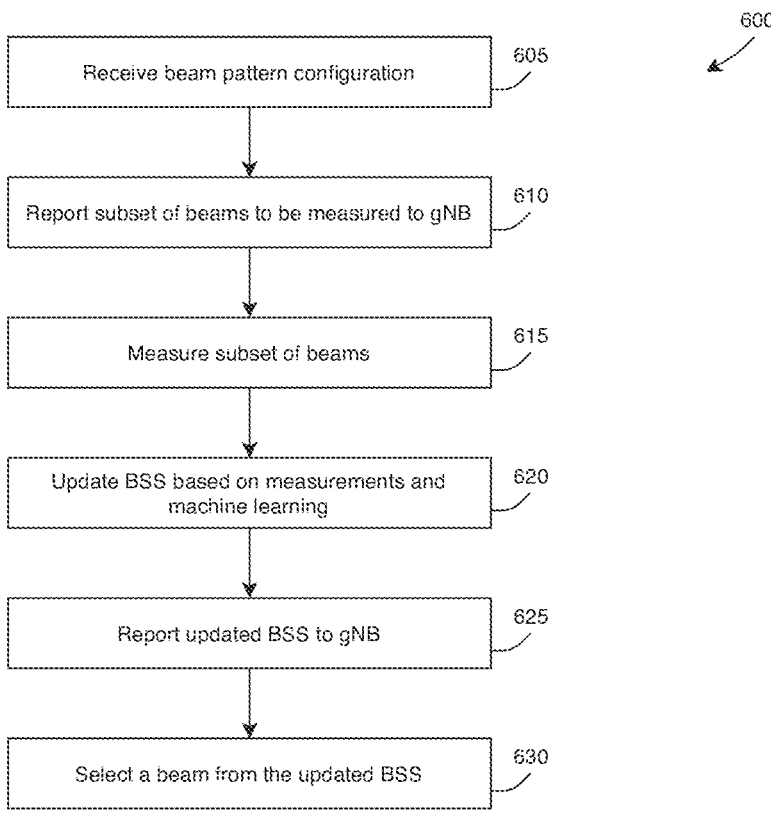
FIG. 6 shows a method of selecting a beam based on machine learning by a UE according to various exemplary embodiments.

FIG. 6 shows a method 600 of selecting a beam based on
machine learning by a UE 110 according to various exem-
plary embodiments. At 605, the UE 110 receives a beam
pattern configuration from the gNB 120A (or 120B). In some
embodiments, in the beam pattern configuration, the gNB
120A configures the number of vertical beams, horizontal
beams, and the oversampling factor(s) for the vertical and
horizontal directions. For example, if the gNB 120A has N
horizontal antennas, it may configure N×K horizontal
beams, where K is the oversampling factor. In some embodi-
ments, the gNB 120A may provide beam information for
each SSB. In some embodiments, the gNB 120A may
provide the beam information via dedicated RRC signaling
or a broadcast signal such as, for example, a system infor-
mation block (SIB).

At 610, the UE 110 reports the subset of beams (e.g., the
SSB indexes) that it will measure based on the received
beam pattern configuration. In some embodiments, the UE
110 may transmit this report via a UE capability report. In
some embodiments, the UE 110 may alternatively transmit
this report via dedicated RRC signaling. In some embodi-
ments, the UE 110 may alternatively transmit this report via
a MAC CE. In some embodiments, upon receiving this report, the gNB 120A may update the CSI-reportConfig
based on the beams (e.g., the SSB indexes) identified in the
report. For example, in some embodiments, the CSI-report-
Config may be updated as explained above with respect to
FIGS. 5B and 5C. In some embodiments, the gNB 120A
may alternatively not update the CSI-reportConfig (keep the
previous CSI-reportConfig) but may only take into account
the SSB indexes in the report for CSI processing unit (CPU)
occupancy. Based on the CPU occupancy, the gNB 120A
will know whether a CPU occupies a certain slot or symbol.

At 615, the UE 110 measures the subset of beams to
determine the BSS. At 620, the UE 110 updates the BSS
based on machine learning and these beam measurements.
At 625, the UE 110 reports the updated BSS to the gNB
120A. In some embodiments, the UE 110 reports the
updated BSS to the gNB 120A via MAC CE or uplink
control information (UCI) in a physical uplink shared chan-
nel (PUSCH) or physical uplink control channel (PUCCH)
transmission. For example, the number of beams in the BSS
may be reported via UE capability or dynamically indicated
via MAC CE or UCI. If a MAC CE is used, the MAC CE
may be similar to the MAC CE of FIG. 5C. If UCI is used,
the UCI may provide a bitmap corresponding to the SSBs,
where a value of 1 may indicate that the corresponding SSB
is included in the BSS and a value of 0 may indicate that the
corresponding SSB is excluded from the BSS. Alternatively,
in some embodiments, the UE 110 may report the SSB
index(es) of the BSS in the UCI.

In some embodiments, upon receiving the reported BSS,
the gNB 120A may update the CSI-reportConfig based on
the beams (e.g., the SSB indexes) identified in the BSS. For
example, in some embodiments, the CSI-reportConfig may
be updated as explained above with respect to FIGS. 5B and
5C. In some embodiments, the gNB 120A may alternatively
not update the CSI-reportConfig (keep the previous CSI-
reportConfig) but may only take into account the SSB
indexes in the BSS for CPU occupancy. Based on the CPU
occupancy, the gNB 120A will know whether a CPU occu-
pies a certain slot or symbol.

At 630, the UE 110 selects a beam from the updated BSS.
In some embodiments, the UE 110 may indicate the beam
with the best quality (e.g., L1-RSRP) to the gNB 120A,
which then selects the beam and sends a beam indication to
the UE 110 to indicate that the UE 110 should switch to this
beam. Alternatively, in some embodiments, the UE 110 and
the gNB 120A may both automatically switch to the beam.
In such an embodiment, the UE 110 and the gNB 120A
switch to the beam after K symbols, where K is one of a
predefined value, configured via RRC signaling, or based on
UE capability. In some embodiments, whether the UE 110
selects the beam or the gNB 120A and the UE 110 auto-
matically switch to the beam may be configured by higher
layer signaling (e.g., RRC signaling) or reported by the UE
110. For example, the UE 110 may provide such information
in a UE capability transmission or via the beam measure-
ment report for the BSS. In some embodiments, the UE 110
may indicate whether the UE 110 will switch to the beam
with the best quality (e.g., L1-RSRP) in the updated BSS
report at 625.

EXAMPLES

A first example includes a user equipment (UE) compris-
ing a transceiver configured to communicate with a base
station of a wireless network and a processor communica-
tively coupled to the transceiver and configured to perform
operations comprising receiving, from the base station of the wireless network, a beam pattern configuration, reporting, to the base station, a subset of beams on which measurements will be performed, performing measurements on the subset of beams, updating a beam search space (BSS) based on the measurements, reporting the updated BSS to the base station and selecting a beam from the updated BSS to switch to.

A second example includes a base station of a wireless network comprising a transceiver configured to communicate with a user equipment (UE) and a processor communicatively coupled to the transceiver and configured to perform operations comprising transmitting a beam measurement configuration to the UE, wherein the beam measurement configuration includes a subset of beams from all available beams on which the UE is configured to perform a measurement, receiving a beam measurement report from the UE including measurements corresponding to the subset of beams, determining a beam search space (BSS) based on the beam measurement report, indicating BSS measurement resources to the UE, receiving a BSS beam measurement report from the UE based on the BSS measurement resources and selecting a beam from the BSS based on the BSS beam measurement report.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above-described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:
   receiving, from a base station of a wireless network, a beam pattern configuration;
   receiving, from the base station, a channel state information (CSI) report configuration (CSI-reportConfig) message comprising a field configured to indicate that the UE is to report layer 1 (L1) reference signal received power (RSRP) for all configured beams;
   performing measurements on all the configured beams; and
   generating, for transmission to the base station, a report comprising one or more synchronization signal block (SSB) indexes corresponding to the all configured beams, wherein a number of SSB indexes in the report is less than a number of beams in all the configured beams.

2. The processor of claim 1, wherein the beam pattern configuration includes a number of horizontal beams, a number of vertical beams, a first oversampling factor in a horizontal direction, and a second oversampling factor in a vertical direction.

3. The processor of claim 1, wherein the beam pattern configuration includes beam information for each of a plurality of synchronization signal blocks (SSBs).

4. The processor of claim 3, wherein the beam information is configured via dedicated radio resource control (RRC) signaling or a system information block (SIB).

5. The processor of claim 1, wherein all the configured beams are based on the beam pattern configuration.

6. The processor of claim 1, wherein the operations further comprise:
   receiving an updated channel state information (CSI) report configuration (CSI-reportConfig) from the base station.

7. The processor of claim 1, wherein the base station does not update the channel state information (CSI) report configuration (CSI-reportConfig), and wherein CSI processing unit (CPU) occupancy is only based on synchronization signal block (SSB) indexes corresponding to the beams.

8. The processor of claim 1, wherein the operations further comprise:
   selecting a first beam;
   switching to the first beam,
   wherein selecting the first beam from the updated BSS is based on a beam indication from the base station.

9. The processor of claim 1, wherein the operations further comprise:
   switching to the first beam after a predetermined number of symbols.

10. The processor of claim 1, the operations further comprising:
   updating a beam search space (BSS) based on the measurements, wherein updating the BSS is further based on machine learning with which the UE is preconfigured.

11. An apparatus comprising processing circuitry coupled to a memory, the processing circuitry configured to:
   receive, from a base station of a wireless network, a beam pattern configuration;
   receiving, from the base station, a channel state information (CSI) report configuration (CSI-reportConfig) message comprising a field configured to indicate that the UE is to report layer 1 (L1) reference signal received power (RSRP) for all configured beams;
   perform measurements on all the configured beams; and
   generating, for transmission to the base station, a report comprising one or more synchronization signal block (SSB) indexes corresponding to the all configured beams, wherein a number of SSB indexes in the report is less than a number of beams in all the configured beams.

12. The apparatus of claim 11, wherein the beam pattern configuration includes a number of horizontal beams, a number of vertical beams, a first oversampling factor in a horizontal direction, and a second oversampling factor in a vertical direction.

13. The apparatus of claim 11, wherein the beam pattern configuration includes beam information for each of a plurality of synchronization signal blocks (SSBs).

14. The apparatus of claim 11, wherein the beam information is configured via dedicated radio resource control (RRC) signaling or a system information block (SIB).

15. The apparatus of claim 11, wherein all the configured beams is based on the beam pattern configuration.

16. The apparatus of claim 11, wherein the apparatus is further configured to:

receive an updated channel state information (CSI) report configuration (CSI-reportConfig) from the base station.

17. The apparatus of claim 11, wherein the base station does not update a channel state information (CSI) report configuration (CSI-reportConfig), and wherein CSI processing unit (CPU) occupancy is only based on synchronization signal block (SSB) indexes corresponding to the beams.

\* \* \* \* \*